Sept. 2, 1952          W. ZWICK          2,608,871
INFINITELY VARIABLE GEAR
Filed Feb. 3, 1949          3 Sheets-Sheet 3
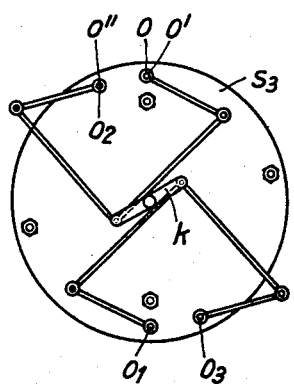
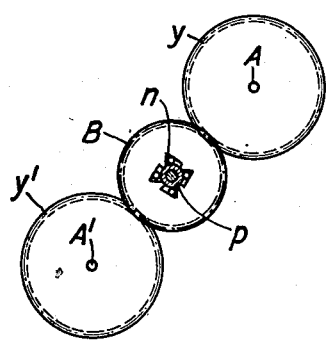
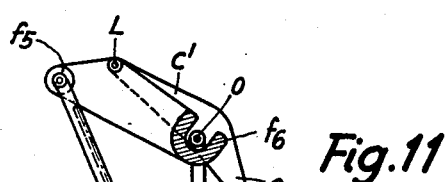
Walter Zwick
INVENTOR
By Robert E. Burns
ATTORNEY Patented Sept. 2, 1952

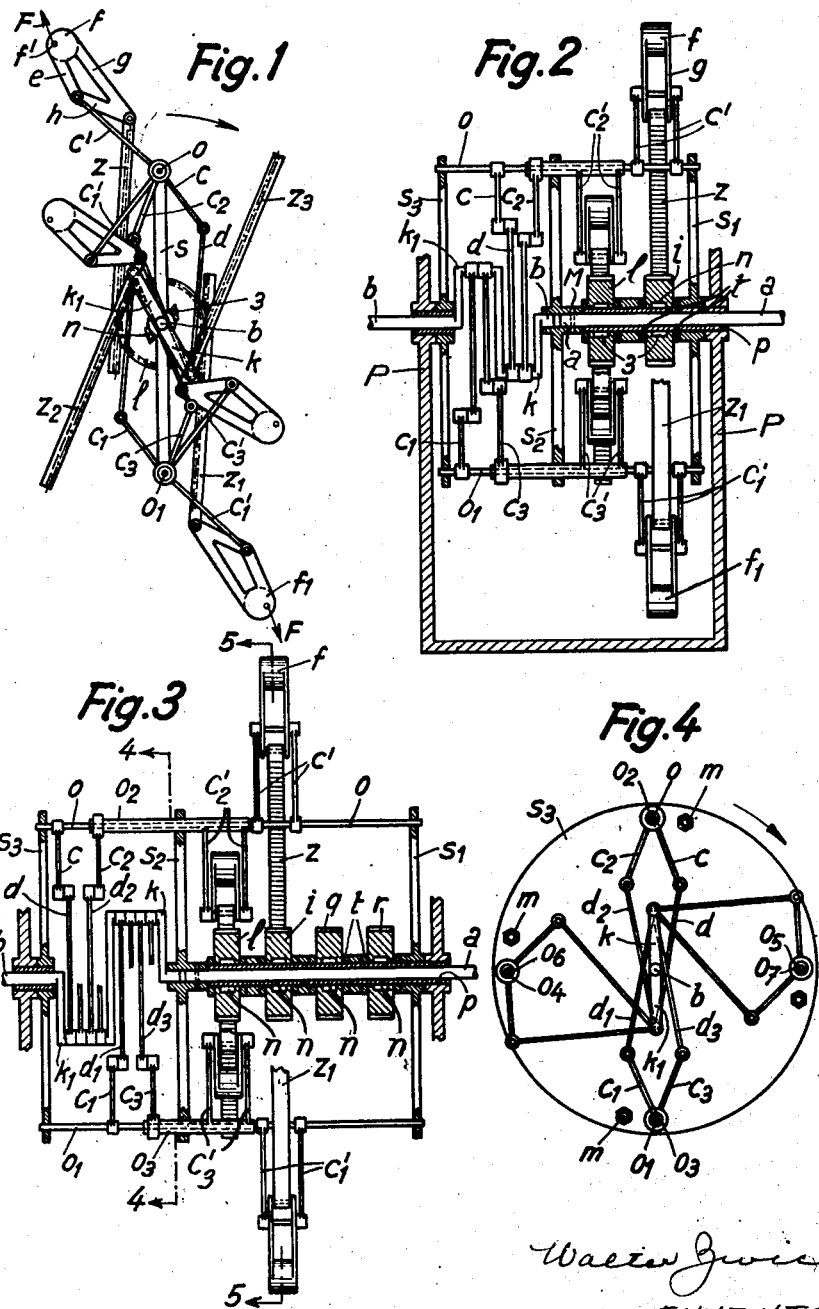

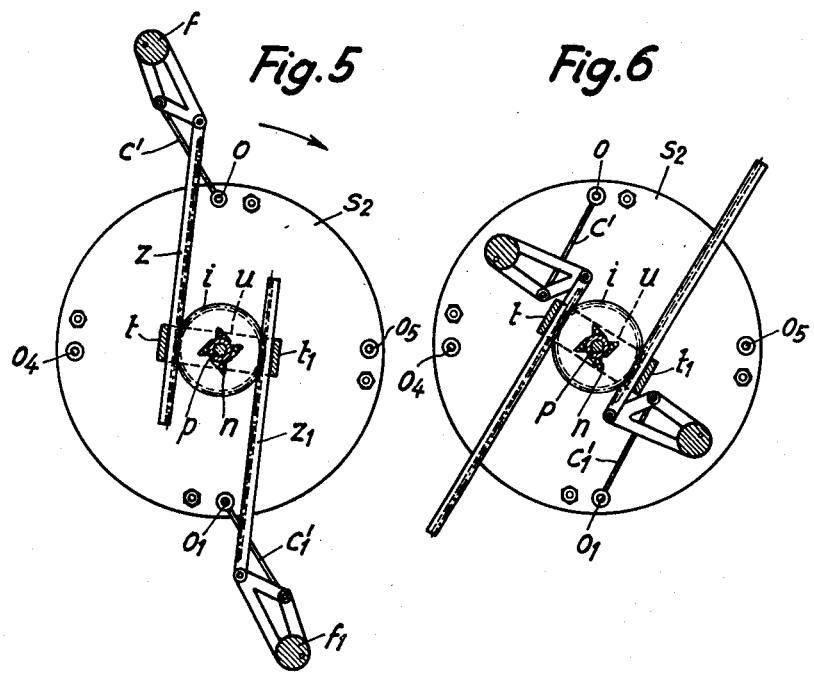
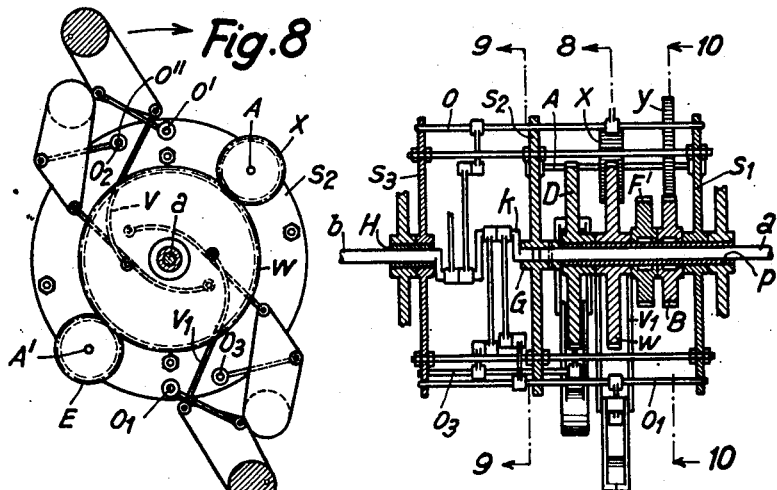

2,608,871

UNITED STATES PATENT OFFICE 2,608,871

INFINITELY VARIABLE GEAR

Walter Zwick, Huemoz sur Ollon, Switzerland

Application February 3, 1949, Serial No. 74,319
In Switzerland December 24, 1948

11 Claims. (Cl. 74—114)

This invention relates to infinitely variable or continuous gears. Such gears are an urgent requirement for use in machine tools and other purposes, especially for use in vehicles.

It is an object of my invention to provide an infinitely variable gear the torque of which is automatically accommodated to the load torque, i. e. to the tractive resistance in the case of vehicles, for instance.

Another object is to provide a gear which is characterised in that rocking members are hinged at eccentrically arranged centers and rotate at the speed of a shaft whilst, on the one side, they are connected to the crank of another shaft by means of a link means, and on the other side, they act on a wheel of a locking mechanism by means of a rack or any other suitable coupling means.

A further object is to link centrifugal weights to the rocking members and to link a rack or another suitable coupling means to centers connected with the centrifugal weights.

A still further object of my invention is to increase the oscillation transmitted to the wheel of the locking mechanism by means of a rack or another coupling means by the insertion of a transmission gear.

Other objects and features will be apparent as the following description proceeds, reference being had to the accompanying drawings, illustrating different embodiments of my invention in a schematic manner, and wherein Fig. 1 is a cross sectional side view of a first example, Fig. 2 is a front view of the example shown in Fig. 1, with different parts in section, Fig. 3 is an axial section through a second embodiment, Fig. 4 is a section along the line 4—4 of Fig. 3, Fig. 5 is a section along the line 5—5 of Fig. 3, Fig. 6 is the same section as Fig. 5, but in another position of the several parts, Fig. 7 is an axial section of a third embodiment, Fig. 8 is a section along the line 8—8 of Fig. 7, Fig. 9 is a section along the line 9—9 of Fig. 7, Fig. 10 is a section along the line 10—10 of Fig. 7, and Fig. 11 illustrates a fourth example.

In the drawings like reference characters indicate corresponding parts in each figure. In the following description speed means always the number of revolutions per unit of time.

Referring now to Figs. 1 and 2, a cage $s$ comprising three disks $s_1$, $s_2$, $s_3$ rigidly connected to one another by bolts $m$ is fixed to a drive shaft $a$ by means of the pin M to rotate at the same speed as the latter. A double-armed rocking lever $c$—$c'$ is fixed to a member $o$ journalled in the disks $s_1$, $s_2$, $s_3$. A driven shaft $b$ coaxial to the drive shaft $a$ comprises a crank $k$ and a return crank $k_1$. The ends of shaft $a$ and crank $k$ are shown in Fig. 2 by two vertical heavy lines at the left of the dotted vertical lines defining pin M. The arm $c$ of the rocking lever $c$—$c'$ is connected with the crank $k$ by means of a link $d$. Let us assume that the cage $s$ rotates while the crank $k$ is at rest, then the lever $c$—$c'$ oscillates. $s$—$k$—$d$—$c$ in Fig. 1 is an articulated quadrangle or an oscillating crank.

A frame $e$—$g$—$h$ is linked to the end of the arm $c'$ of the lever $c$—$c'$, this frame carrying a centrifugal weight $f$ and having a rack $z$ linked to it. The common point of application of the centrifugal forces F applied to $e$, $f$, $g$, $h$ and $z$ is designated by $f'$. The force F acts always in radial outward direction with regard to the axis of rotation of the shafts $a$ and $b$. The rack $z$ meshes with a gear wheel $i$ loosely and rotatably mounted on a fixed bearing $p$. The rack $z$ is held in correct position with respect to wheel $i$ by means of guides $t$, $t_1$ as shown in Figs. 5 and 6. This wheel $i$ forms a part of a coaster brake $n$ locking on counterclockwise rotation. On the crank $k$ being still assumed to be at rest and the frame $e$—$g$—$h$ being moved by the oscillating crank $s$—$k$—$d$—$c$ in counterclockwise direction as seen from right to left in Fig. 2, the rack $z$ tries to rotate the gear wheel $i$ in the counterclockwise direction relative to the cage $s$. In an absolute sense the wheel $i$ comes to rest if the counterclockwise rotation imparted by the crank through the rack $z$ is equal to the clockwise rotation imparted by the cage $s$. In this case, the wheel $i$ is also at rest with regard to the fixed bearing $p$ on which it is journalled. If the counterclockwise rotation of the wheel $i$, imparted by the crank tends to further increase, this is prevented by the coaster brake $n$ consisting of the wheel $i$ and the rollers 3 engaging the bearing $p$. Therefore, either the frame $e$—$g$—$h$ gives way whereby the centrifugal weight $f$ approaches the shaft $a$ while offering considerable resistance to this displacement, or the crank $k$ gives way and moves in clockwise direction. In most cases both phenomena, i. e. giving way of the frame $e$—$g$—$h$ and rotation of the crank $k$ will occur simultaneously. The angle through which the crank $k$ will be rotated, that is, the distance by which the centrifugal weight $f$ will be displaced depends on the load torque to be overcome at the crank $k$ on the one hand, and on the speed of the drive shaft $a$ on the other hand, in that this speed determines the resistance which the centrifugal weight $f$ will offer to a change in position.

Instead of a coaster brake any other suitable locking mechanism or brake may be used.

If the crank $k$ rotates, the wheel $i$ gets through the rack $z$ and the lever $c$—$c'$ an oscillation from the uniformly rotating shaft $a$ by the intermediary of the parts $s, c', e, g, h, z$ and an oscillatory movement from the crank through the parts $d, c, c', e, g, h, z$. The direction of the oscillation caused by the rotation of shaft $a$ is either clockwise or counterclockwise with regard to cage $s$, so that the wheel $i$ is alternately retarded or accelerated with regard to the cage $s$, the speed of wheel $i$ decreasing and increasing with regard to cage $s$ in accordance with the well-known kinematics of the crank gear. If the angular velocity imparted to the wheel $i$ by the crank $k$ in counterclockwise direction is equal to the angular velocity received from the cage $s$ in the clockwise direction, the wheel $i$ is at rest in the absolute sense. A further increase of the angular velocity of the wheel $i$ in counterclockwise direction by the crank $k$, by which this velocity would become negative, is prevented by the coaster brake $(i, r, p)$. This fact and also the structural dimensions chosen (e. g.: $c'>c$, small diameter of wheel $i$) result in a limitation of the speed of the crank $k$ up to which the coaster brake locks and exerts a torque. In the example of Fig. 1 this limiting speed amounts to slightly more than half the driving speed.

If the centrifugal weight $f$ is forced by the driven crank $k$ towards the axis of rotation of the shafts $a$ and $b$, it must be done against the constraint of the centrifugal force F and against a second force, namely the one necessary for decreasing the kinetic energy of the centrifugal force from a maximum value to a minimum value, according to the greatest and the smallest amplitudes of this centrifugal weight. This force increases with increasing driving speed and with decreasing driven speed, so that it is dependent on the relative speed between the driving and driven shafts. This second force does not exert any effect on the driven crank $k$ because on the centrifugal weights being forced inwardly, it is added to the centrifugal force, while on the opposite movement of the centrifugal weights it is subtracted from the centrifugal force, so that with respect to a complete period there is no effect of this energy-changing force upon the driven shaft provided that the driven speed is almost as great as the driving speed. However, the conditions will be altered as soon as the coaster brake locks owing to a smaller driven speed. Now, the coaster brake, that is, a stationary machine part exerts the force necessary for pressing the centrifugal weights backwards, and an exactly corresponding force is given to the crank $k$ in addition to the force applied through the parts $a$—$s$—$c$—$d$—$k$ (Fig. 1). This force pressing the centrifugal weights inwards depends both on the driving speed determining the energy of the centrifugal weights, and on the difference of the driven speed from the driving speed. If the driven shaft rotates slowly, the change in the position of the centrifugal weights must be obtained in a shorter time than if its speed approaches the driving speed. When the shaft $a$ rotates very rapidly and the crank $k$ is almost at rest, this force may have considerable magnitude. Therefore, a vehicle will be accelerated very quickly if the drive shaft rotates at a high speed. The great torque on the driven shaft results from the power on the rapidly rotating drive shaft. A reaction torque occurs on the coaster brake. The coaster brake locks without shocks for the reason that, on the one hand, it couples parts the absolute speed of which is nil, and, on the other hand, the force exerted by the coaster brake does not occur until the latter has locked. It does not exist before that moment.

The above-mentioned arrangement will now be multiplied in order to obtain balancing of forces and masses and a substantially uniform torque. Referring to Fig. 1, a similar arrangement as above-described is reversed through 180°. It has a centrifugal weight $f_1$ fixed to a rod $o_1$ journalled in the disks $s_1, s_2, s_3$ and a rocking lever $c_1$—$c_1'$ and acts on the return crank $k_1$. It comprises a rack $z_1$ meshing with the wheel $i$. By this second arrangement a complete balancing of forces and masses is obtained because the two weights $f$ and $f_1$ and all transmission parts are always in symmetrical position with regard to the axis of the shafts $a$ and $b$, so that only a pure couple of forces occurs. Besides this, other rocking levers $c_2$—$c_2'$ and $c_3$—$c_3'$ coaxial to levers $c$—$c'$ and $c_1$—$c_1'$ respectively and fixed to sleeves $o_2, o_3$ respectively journalled on the rods $o$ and $o_1$, respectively are oscillated by the crank drive $k$ and $k_1$. With regard to the direction of rotation of the cage $s$ (clockwise direction) the parts $c_2$ and $c_3$ lie behind the line $o$—$o_1$, and the parts $c$ and $c_1$, in front of this line. $c_2$—$c_2'$ is a single-armed lever pivoted as at $o$ in opposition to the double-armed lever $c$—$c'$. Therefore, when the parts $c'$ and $c_1'$ are rocking outwardly, the parts $c_2'$ and $c_3'$ are pressed inwardly. Whilst, during half a revolution of the crank $k$ the parts $c'$ and $c_1'$ drive the wheel $i$ in counterclockwise direction relatively to the cage $s$, the parts $c_2'$ and $c_3'$; during the other half of the revolution, drive another gear wheel $l$ in counterclockwise direction, likewise loosely mounted on the bearing $p$, by means of the rack $z_2$ and $z_3$ engaging the wheel $l$. This adds to the smoothing of the torque. The gear wheel $l$ forms a part of a coaster brake comprising rollers 3 engaging the bearing 2. This brake, too, admits only a rotation in clockwise direction.

There may be provided more than two axes of rotation for the rocking levers without that more than one pair of cranks $k, k_1$, becomes necessary.

Referring now to Figs. 3 to 6, the cage is formed of three discs $s_1, s_2$ and $s_3$, all connected with the drive shaft $a$. They are interconnected by bolts $m$ (Fig. 4) to form a rigid cage on which the shafts $o, o_1, o_4$ and $o_5$ are mounted (Fig. 4). Fig. 4 shows a multiple oscillating crank. The arm $c$ is fixed to the shaft $o$, arm $c_2$ to the hollow shaft $o_2$ etc. The hollow shafts $o_2, o_3, o_6$ and $o_7$ are shorter at both ends than the respective solid shafts $o, o_1, o_4$ and $o_5$ traversing them. In Fig. 5 only one pair of rocking arms carrying the centrifugal weights is shown, viz.: $c'$ and $c_1'$ driving the common gear wheel $i$ of the coaster brake $n$ by means of the racks $z$ and $z_1$. The coaster brake allows the wheel $l$ to rotate in clockwise direction on the stationary bearing bush $p$ whilst it locks the wheel $l$ in counterclockwise direction. The racks $z$ and $z_1$ are formed as double racks (Fig. 3). The remaining centrifugal weights are not shown but are arranged in a similar manner as in Fig. 1. Thus, the centrifugal weights connected to the rocking levers $c_2$ and $c_3$ act on a single, loosely rotatable gear wheel $i$ (Fig. 3) by the intermediary of the hollow shafts $o_2$ and $o_3$ and two double racks. Loosely rotatable gear wheels $g$ and $r$ (Fig. 5) are moved in a corresponding manner by the other rocking levers and centrifugal weights. Fig. 6 represents the arms $c'$ and $c_1'$ in their position nearest to the axis of rotation of the shafts $a$ and $b$.

The racks $z$ and $z_1$ are guided in guides $t$ and $t_1$ guaranteeing correct position of the racks with regard to the gear wheel $i$. The guides $t$ and $t_1$ are provided on a guide member $u$ rotatably mounted on the bush $p$ or on the wheel $i$. The guide member $u$ enables the racks to rotate about the axis of rotation of the shaft $a$ either together with the wheel $i$ or by rolling on the wheel $i$.

Figs. 7 to 10 illustrate a further embodiment of my invention. The oscillating cranks (Fig. 9) are not combined two and two on hollow shafts, but the centres of rotation lie close to each other, such as $o'$ and $o''$ for instance. The rocking levers carrying the centrifugal weights do not move racks as before, but links $v$, $v_1$ (Fig. 8) the other ends of which are eccentrically hinged to a toothed wheel $w$. Therefore, the wheel $w$ receives an oscillating rotation derived from the crank drive. This oscillation is transmitted to a toothed wheel $x$ mounted on a shaft $A$ supported on the cage $s_1$—$s_2$ rigidly connected with the drive shaft $a$ (Fig. 7). The shaft $A$ carries a toothed wheel $y$ which is in mesh with the central toothed wheel $B$. This latter is loosely mounted on the bearing bush $p$ and constitutes a part of the coaster brake $n$ (Fig. 10) locking in the counterclockwise direction and admitting rotation in the clockwise direction. The ratio of transmission is chosen so that the oscillatory movement is increased. In this way, the absolute angular volocity of the wheel $B$ of the coaster brake will be sooner nil than in the above example, i. e., the coaster brake will lock through a larger angle of the movement of the crank $k$ so that the latter will be driven through this greater angle and the range of the infinitely variable torque will be increased, because it is in the coaster brake where the reaction torque occurs, to which the torque applied to the crank is opposite but of equal magnitude. The coaster brake also locks at higher speeds of the crank, although the angle through which the brake gives a torque, decreases with increasing speed of the crank. Therefore, a larger range of transmission between the driving and the driven shafts is obtained, the extension of which may be chosen at will by a suitable choice of the diameters of the wheels $w$, $x$, $y$ and $B$. Finally, this arrangement permits giving the stationary bush $p$ and the coaster brake suitable diameters without risking large dimensions of the rocking levers and the racks. The arrangement of Figs. 7 to 10 favors a compact design. The shafts $o_2$ and $o_3$ are shorter at their right ends than the shafts $o$ and $o_1$ in order to leave free way to the rocking levers of the shafts $o$ and $o_1$. The shafts $o_2$ and $o_3$ work upon a toothed wheel $D$ (Fig. 7) similar to the toothed wheel $W$. The wheel $D$ acts upon a brake wheel $F''$ by means of gear wheels $E$, $A'$, $Y'$ lying diametrically opposite to $X$, $A$, $Y$ for the sake of mass balancing (Figs. 7, 8 and 10).

The disc $s_2$ of the cage is directly fixed to the drive shaft $a$ and carries a bearing $G$ (Fig. 7) for the crankshaft $b$. The disc $s_1$ turns loosely on the stationary bearing bush $p$, and the disc $s_3$ loosely on the stationary bearing bush $H$ (Fig. 7).

Since one of the two centrifugal weights linked to a shaft ($o$, for instance) always swings outwardly when the other moves inwardly (Figs. 5 and 6), the centrifugal forces with their forced fluctuations are already counterbalanced on the shaft or axle $o$. Therefore, great forces neither reach the drive shaft $a$ nor the driven shaft $b$. There are no undesirable reactions of the gear to the prime mover because on each shaft or axle two centrifugal weights are oppositely moved. Between the centrifugal weights of a shaft or axle there is a balancing in that sense that one weight receives energy while the other gives out energy.

The gear according to my invention works also as a coupling as soon as drive speed and driven torque have reached certain values. In this case, the gear establishes direct connection between drive shaft and driven shaft. The centrifugal forces of all centrifugal weights exert torques on the crank and the return crank in the same direction, namely in the clockwise direction. For the sum of all centrifugal forces, there is a distinct position of the centrifugal weights and the crank, where the torque exerted on the crank is a maximum. If this torque cannot be overcome by the load torque, coupling takes place. The load torque is not able to force the centrifugal weights back and for this reason the whole gear must rotate together with the drive shaft at the same speed. Moreover, the gear works as an elastic coupling. Fluctuations of the input torque are absorbed by variations of kinetic energy of the centrifugal weights and can thus not reach the driving shaft. Variations of the load torque result in changes in position of the centrifugal weights with regard to the axis which they approach when the load torque is increased. On a further increase of the load torque the maximum torque of all centrifugal weights will finally be exceeded so that the gear will slip, while the average value of the torque remains unchanged. The torque fluctuates periodically about this average value. The instantaneous torque exerted by each centrifugal weight is increased just as much as it is decreased in the next phase. The excess power corresponding to the difference of the input speed from the output speed returns into the prime mover and accelerates it while the driven shaft is being retarded. In this way conditions will soon be reached, at which the coaster brake locks and increases the drive torque. Suitable dimensions being provided, slip does not occur before the driven shaft has reached a speed which is smaller than the speed at which coupling takes place, i. e., at which slip disappears. This fact is very desirable for use of my gear in vehicles. If the crank is held fast to be at rest, the whole power returns to the prime mover at a very great torque exerted on the crank.

Referring now to Fig. 11, the centrifugal weight $f$ is replaced by two weights $f_5$ and $f_6$. The weight $f_5$ represents the mass of the rack $z$ etc. It exerts a smaller centrifugal force than the weight $f_6$. The point of application of the centrifugal force exerted by the weight $f_6$ lies in the axis of $o$. As a rule the weight $f_6$ does not take part in the oscillations of the lever $c$—$c'$ and is thus not pressed inwardly and, therefore, does not exert a corresponding force. The weights $f_5$ and $f_6$ are rigidly connected with each other and are linked to the arm $c'$ as at $L$.

The weight $f_5$ takes part in the oscillations of the arm $c'$. When the angular velocity of the toothed wheel $i$ is nil, that is, when the coaster brake locks, also $f_6$ is forced inwardly since $c$—$c'$ is further rotated in the counterclockwise direcion, and $f_6$ exerts a force on the crank $k$ by means of the parts $c'$—$c$—$d$. When the weight $f_6$ is swung out again, it forces the weight $f_5$ inwardly and holds the coaster brake further in locking condition by means of the rack $z$. Weight $f_6$ is further supported on the coaster brake, exerts further a torque on the crank $k$ and returns without shocks into the rest position shown in Fig. 11.

The weight $f_5$ is chosen in such a manner that the centrifugal force applied to it may effect the above-mentioned direct coupling of shaft $a$ with shaft $b$ as soon as a certain drive speed and a certain load torque occur.

My gear is especially well suited for vehicles driven by internal combustion engines because it is automatically and infinitely variably adapted to the load torque, since the latter furnishes the force for forcing the centrifugal weights back. My gear likewise varies automatically and infinitely in dependence on the drive speed for the reason that the centrifugal weights rotate at this speed so that the force necessary for balancing the load torque depends on the drive speed. The transmission ratio automatically adjusted by the gear depends on the drive speed and the load torque.

When the cage $s_1$, $s_2$, $s_3$ (Fig. 3) moves at a lower speed than the crank, that is, when the vehicle pushes, the coaster brake will also lock, but during the other half of a revolution, and will drive the cage. From this it follows that the prime mover may also act as a brake.

While I have described and illustrated different embodiments of my invention, I do not wish to unnecessarily limit the scope of this invention, but reserve the right to make such modifications and rearrangement of the several parts as may come within the purview of the accompanying claims:

I claim:

1. In an infinitely variable gear, a shaft, a crankshaft, rocking members with their axes of oscillation eccentrical to the axis of said shaft and arranged to rotate together with the first-mentioned shaft at the same speed, centrifugal weights linked to said rocking members, pivoting means rigidly connected with said centrifugal weights, link means connecting said rocking members with said crankshaft, a locking mechanism comprising a wheel, and coupling means linked on said pivoting means and coupled with said wheel to act on the latter.

2. In an infinitely variable gear according to claim 1, a transmission gear arranged to increase the oscillations transmitted to said wheel by said coupling means.

3. In an infinitely variable gear according to claim 1, some of said rocking members forming double-armed levers, some others single-armed levers.

4. In an infinitely variable gear according to claim 1, some of said rocking members forming double-armed levers, some others single-armed levers, said rocking members being arranged in pivotable pairs each comprising a double-armed lever and a single-armed lever.

5. In an infinitely variable gear according to claim 1, some of said rocking members forming double-armed levers, some others single-armed levers, each of said double-armed levers being pivotable about a center close to the pivoting center of one of said single-armed levers.

6. In an infinitely variable gear according to claim 1, two at a time of said centrifugal weights being arranged symmetrically with regard to the axis of rotation of said shaft.

7. In an infinitely variable gear according to claim 1, guides rotatable around the axis of rotation of said shaft, said coupling means forming racks movably guided in said guides.

8. In an infinitely variable gear according to claim 1, a member rotatable around the axis of rotation of said shaft, comprising two guides symmetrically arranged with regard to the axis of rotation of said member, said coupling means forming racks guided in said guides.

9. In an infinitely variable gear according to claim 1, said centrifugal weights being able to exert by their centrifugal force alone a torque on said crankshaft by the intermediary of said rocking members and said link means.

10. In an infinitely variable gear according to claim 1, the effect of each of said centrifugal weights corresponding to the effect of two centrifugal weights, one of which carries out no oscillation in the case of direct coupling, while the other furnishes the centrifugal force necessary for coupling.

11. In an infinitely variable gear, a shaft, reciprocating means, rocking members with their axes of oscillation eccentrical to the axis of said shaft and arranged to rotate together with the first-mentioned shaft at the same speed, centrifugal weights linked to said rocking members, pivoting means rigidly connected with said centrifugal weights, link means connecting said rocking members with said reciprocating means, a locking mechanism comprising a wheel, and coupling means linked on said pivoting means and coupled with said wheel to act on the latter.

WALTER ZWICK.

REFERENCES CITED

The following references are of record in the file of this patent:

UNITED STATES PATENTS

| Number | Name | Date |
|---|---|---|
| 1,276,168 | Buchholz | Aug. 20, 1918 |
| 1,542,668 | Constantinesco | June 16, 1925 |
| 1,718,092 | Turner | June 18, 1929 |
| 1,798,723 | Chalmers | Mar. 31, 1931 |
| 2,144,609 | Barber | Jan. 24, 1939 |

FOREIGN PATENTS

| Number | Country | Date |
|---|---|---|
| 724,757 | France | May 2, 1932 |